United States Patent [19]

Gange et al.

[11] 4,271,377
[45] Jun. 2, 1981

[54] SYSTEM FOR COMPENSATING FOR CATHODE VARIATIONS IN DISPLAY DEVICES UTILIZING LINE CATHODES

[75] Inventors: Robert A. Gange, Belle Mead; Frank J. Marlowe, Kingston, both of N.J.

[73] Assignee: RCA Corporation, New York, N.Y.

[21] Appl. No.: 82,531

[22] Filed: Oct. 9, 1979

[51] Int. Cl.³ .................................................. H01J 29/52
[52] U.S. Cl. .................................... 315/366; 315/383; 315/307
[58] Field of Search ....................... 315/366, 383, 307

[56] References Cited

U.S. PATENT DOCUMENTS

| 2,858,464 | 10/1958 | Roberts | 313/69 |
|---|---|---|---|
| 3,482,309 | 12/1969 | Bouchard | 315/383 |
| 3,531,681 | 9/1970 | Harden, Jr. | 315/13 R |
| 4,077,054 | 2/1978 | Endriz | 315/366 X |
| 4,121,137 | 10/1978 | Credelle | 315/366 |
| 4,126,814 | 11/1978 | Marlowe | 315/307 |
| 4,128,784 | 12/1978 | Anderson | 313/422 |

Primary Examiner—Malcolm F. Hubler
Attorney, Agent, or Firm—Eugene M. Whitacre; Dennis H. Irlbeck; Lester L. Hallacher

[57] ABSTRACT

In a flat panel cathodoluminescent display utilizing a plurality of electron guns a single line cathode is used as the electron source for all guns. Changes in electron beam current resulting from vibration of the line cathode are compensated for by the application of voltages which are related to the current changes. The compensating voltages are applied through an impedance network which relates the voltages in accordance with the envelope of vibration so that the actual compensations at the individual guns are related to the actual current changes at the respective guns.

22 Claims, 4 Drawing Figures

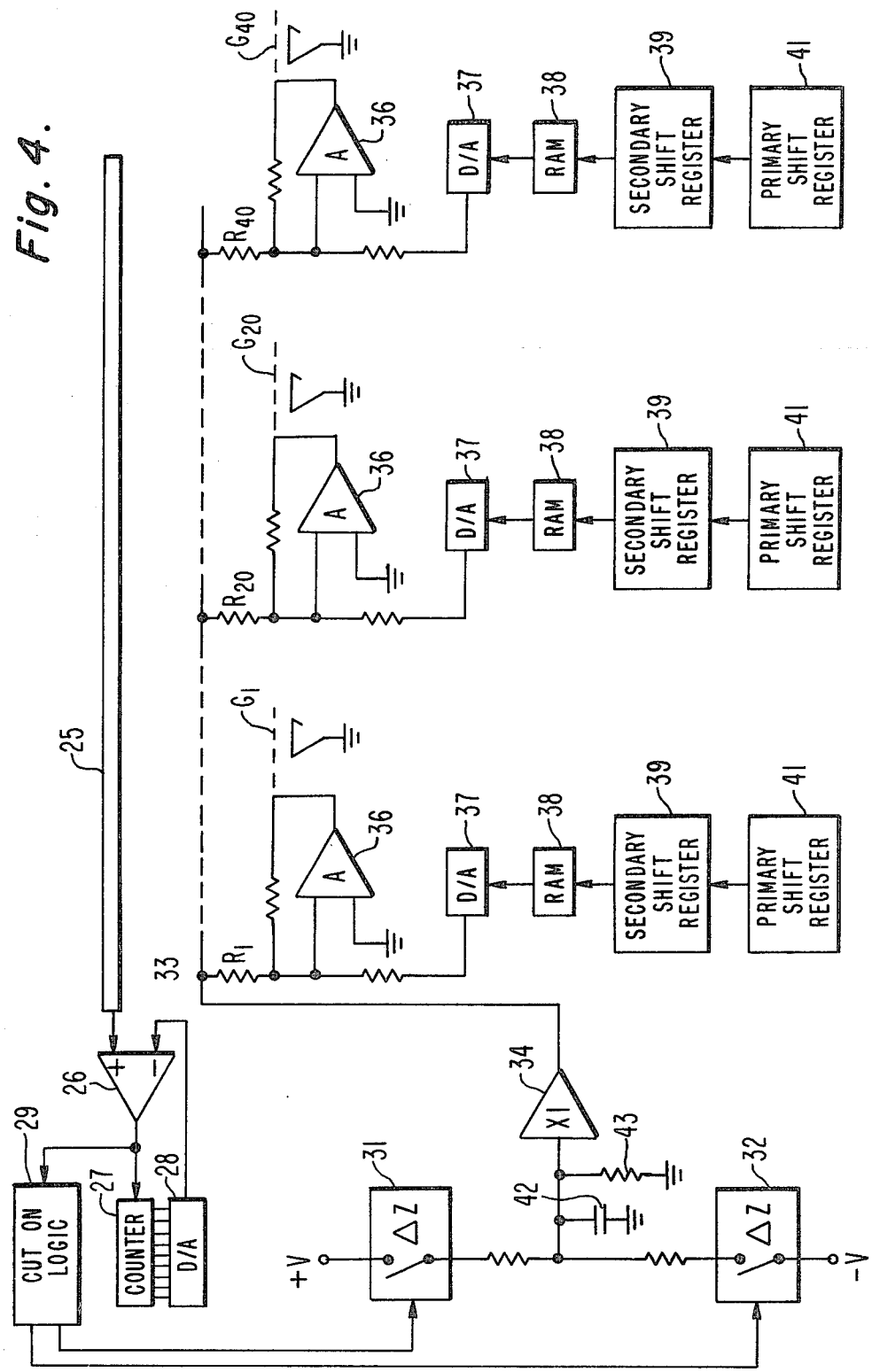

SYSTEM FOR COMPENSATING FOR CATHODE VARIATIONS IN DISPLAY DEVICES UTILIZING LINE CATHODES

BACKGROUND OF THE INVENTION

This invention relates generally to flat panel image display devices utilizing line cathodes and particularly to systems for compensating for electron beam current variations caused by the mechanical vibration of the cathodes in such systems. Exemplary of systems which utilize line cathodes are the two systems described in U.S. Pat. No. 4,121,137, issued to Thomas L. Credelle and U.S. Pat. No. 4,126,814, issued to Frank J. Marlowe. The systems described in these two patents relate to flat panel display devices and each of the patents describes a system for maintaining a uniform brightness across the entire viewing area of such a display.

U.S. Pat. No. 4,126,814 is of particular interest because, as will be fully described hereinafter, the inventive features of the instant invention can be combined with the unique circuitry described in the patent to realize an improved visual display in flat panel display devices.

The environment of the instant invention can be understood by making reference to FIG. 1 which shows an exemplary flat panel display device of the type presently known in the art. In order to show the internal structure the upper and lower portions of FIG. 1 are shown in partial cut-away section.

In FIG. 1 the flat panel display device is generally indicated by reference numeral 10 and includes a back panel 11 and a display panel 12 which are coupled by two side walls 13 and upper and lower walls 14 and 16, respectively. The envelope 10, formed by the two planar panels and four sides, is evacuated in the same manner as other cathodoluminescent display devices. A plurality of nonconductive vanes 17 divide the envelope 10 into a plurality of electron beam channels 18. Each of the channels 13 contains two grids or meshes 19 and 21 which are parallel spaced along the length of the channels 18 to form guides so that electron beams can travel the length of the channels 18 between the two meshes 19 and 21. The construction and operation of the display device shown in FIG. 1 are fully described in U.S. Pat. Nos. 4,121,137 and 4,126,814 and these descriptions are incorporated by reference herein.

As shown in FIG. 1, cathode 22 is supported at both ends by mounting means 23 and 24 so that the entire length of the cathode extending between the two mounts 23 and 24 is free. One end of the cathode 22 is provided with an electrical connecting means 26 permitting the application of an energizing voltage to the cathode. The vanes 17 divide the envelope into a plurality of equally dimensioned channels (for example 40) and, therefore, the cathode 22 can be viewed as a plurality of cathodes equal in number to the number of channels and individually placed at the centers of the channels 18.

The display device 10, also includes a collector 25 extending the entire length of the side 14 and transversely across the ends of all of the channels 18. Electron beams propagating along the channels 18 and not ejected onto the display surface 12 are made to impact with the collector 25. As described hereinafter the currents resulting from such impacts are detected at the collector 25 and used to establish voltages. These voltages vary because of vibration of the cathode and thus are used as vibration compensation voltages to offset the detrimental effects of the cathode vibration on the display panel 12.

Cathodoluminescent display devices of the type described with respect to FIG. 1 have been demonstrated as being feasible for large flat panel displays. However, because a single line cathode is used and because the cathode is supported only at the two ends, the cathode is placed under tension in order to accurately position and space the cathode with respect to the two meshes 19 and 21. The cathode therefore is subjected to vibration which degrades the fidelity of the display because the electron beam current fluctuates as a result of the vibration. A more complete understanding of the effect of the vibration on electron beam current can be gained by viewing FIGS. 2 and 3.

In FIG. 2 horizontal displacement in the Z direction results in a change $\Delta z$ of the spacing z between the cathode 22 and the guide meshes 19 and 21. This motion in FIG. 1 appears as vertical motion. Vibration in the Y direction changes the position of the cathode 22 with respect to the center of the space between the meshes 19 and 21; in FIG. 1 such motion is horizontal. Vibration of the cathode 22 can occur in the Z direction, the Y direction or the vector summation of any direction between those two directions. The effect of vibration in the Y direction on electron beam current is different from the effect of vibration in the Z direction.

Typically the cathode 22 is positioned along the center line of the spacing between the guide meshes 19 and 21. With the cathode in this position electrons emitted by the cathode 22 enter the spacing between the guide meshes 19 and 21 substantially uniformly dispersed above and below the center line. However, because vibration in the Y direction vertically displaces the cathode 22 in FIG. 2, the balance of electron entrance with respect to the center line is upset so that fewer electrons enter the beam guide when the cathode is displaced from the center position. The instant invention does not provide specific means for compensating for this vibration; however, some compensation is automatically provided because Y direction vibration causes a decrease in electron beam current. Accordingly, because the inventive system provides compensating voltages which are related to increases and decreases in the electron beam current of each electron gun of the system, some compensation for Y directed vibration is automatically provided.

Vibration in the Z direction causes the spacing z between the cathode 22 and the grid meshes 19 and 21 to increase and decrease at a frequency which is identical to the vibration frequency of the cathode. As is known to those skilled in the art, the frequency of vibration of a wire under tension supported only at the ends is inversely proportional to the length of the wire and the square root of the ratio of the mass per unit length of the wire and the tension in the wire. Because all of these factors are known, it is possible to determine the resonant frequency of the cathode. Typically, this frequency will be between 20 Hz and 200 Hz. The frequency of the application of the vibration compensating voltages will be dependent upon the horizontal sweep time of the electron beams, typically this is 15 KHz. Because of the substantial difference, between these two frequencies (which in all instances is at least 75:1) the cathode can be considered to be at rest during the period of horizontal sweep and for the purposes of applying the compensation voltages and for determining the magnitude of such voltages.

The effect of cathode vibration in the Z direction can be expressed as:

$$\frac{i}{I} = \left(\frac{z_o}{z}\right)\left[\frac{V_c - V_m}{V_c}\right]^2 \quad (1)$$

where
i = beam current
I = quiescent current at $z = z_o$
$z = z_o + \Delta z$ instaneous guide cathode separation
$z_o = z$ with no cathode vibration
$V_m$ = modulation potential
$V_c$ = cutoff voltage By denoting the total compensation voltage required as V, the compensation voltage is described by:

$$V = \sum_{i=o}^{n} V_i \quad (2)$$

where
V = total compensation voltage
$V_o$ = quiescent compensation voltage
$V_1$ = first harmonic compensation voltage
$V_2$ = second harmonic compensation voltage
$V_i$ = highest harmonic for which a compensation voltage is required When $V = V_o$ and $z = z_o$ there is no vibration and no compensation is required. However, when z is not equal to $z_o$ the necessary compensation can be shown to be:

$$\sum_{i=1}^{n} V_i = \frac{z_o - z}{2}\left\{\beta - \frac{(2Cz_o - 1)(V_C - V_o)}{z_o}\right\} \quad (3)$$

where
$$\beta = CC_1 \sum_{n=1}^{\infty} \frac{(Cz_o)^n}{n!}$$
$C, C_1$ = constants If only the fundamental is compensated for, it can be mathematically shown that the required compensation voltage defined by expression (3) reduces to $$V_1 = -\frac{\Delta z}{2}\left\{\beta - \frac{(2Cz_o - 1)(V_c - V_o)}{z_o}\right\} \quad (4)$$

where C is a constant.

It is evident from equation 4 above that the instantaneous electron beam current is linearly related to the displacement $\Delta z$ of the cathode with respect to the opening between the guide meshes 19 and 21. However, because the cathode 22 displays the characteristics of a vibrating wire, the deplacement $\Delta z$ is different for each of the electron beam channels 18. This can be understood by making reference to FIG. 3.

In FIG. 3 the cathode 22 is shown in a rest position 22a and an instantaneous displaced position 22b, under conditions appropriate to equation 4. Additionally, because the cathode is centered with respect to the display panel 10, the maximum displacement occurs between the 20th and 21st modules, for the 40 module example given herein. It naturally follows that the minimum displacement occurs at the center of the 1st and 40th modules. In FIG. 3, five of the forty modules are indicated as $n_1$, $n_{10}$, $n_{20}$, $n_{31}$ and $n_{40}$. In FIG. 3, the maximum displacement between the 20th and 21st modules, is represented by the amplitude A. The displacement at any arbitrary position along the cathode is represented by $\Delta z$. From the definition of the configuration of a vibrating wire, $\Delta z$ can be shown to be:

$$\Delta z = A \sin \pi \left[\frac{nM + s}{NM + 2s}\right] \quad (5)$$

where:
$\Delta z$ = amplitude at right hand boundary of module "n"
N = the total number of modules
s = distance between outside boundaries of outermost modules and the cathode mounts
M = the center to center distance between adjacent modules
A = $\Delta z$ at the antinode
n = the module number along the line cathode length.

Equation (5) and inspection of FIG. 3 show that the displacement $\Delta z$ is symmetrical about the boundary between the 20th and 21st modules which is located at the antinode of the vibrating cathode. Hence, the displacement $\Delta z$ at the right boundary for the 10th and 30th modules is the same, as is the displacement 5th and 35th modules, etc.

In FIG. 3 the cathode 22 is supported at a distance s from the left and right edges respectively of the outermost modules n1 and n40. For this reason the displacement $\Delta z$ for the two outer electron guns is always greater than zero when the cathode 22 is vibrating. The two portions s of the cathode 22 are not associated with any of the channels 18 and thus have no affect on the quality of the visual display. Also, the antinode is located at the boundary between the modules n20 and n21. The amplitude $\Delta z$ given by equation 5, therefore, is not located at the center of the modules, but rather is defined at points located along the right hand boundary of each module. However, because the current variations which occur due to vibration of the cathode are sensed at an electron gun associated with the center of module n20, the sensing occurs at a location slightly displaced from the antinode. This displacement would result in the introduction of a slight error because the distance $\Delta z$ at the center of module n20 is less than the amplitude A at the antinode. Equation 5 can be corrected for this displacement by subtracting the term: "M/2" from the numerator, where M represents the center to center spacing of adjacent modules. In equation 5 the denominator is equivalent to the length of the cathode 22 between the mounts 23 and 24. The amplitude at the center of the "nth" module is therefore:

$$\Delta z = A \sin \pi \left[\frac{nM + s - \frac{M}{2}}{NM + 2s}\right] \quad (6)$$

where:
$\Delta z$ = displacement along the cathode at center of module "n"
A = displacement at the antinode
N = the total number of modules (electron guns)
M = the center to center distance of adjacent modules
s = the distance between the outside surfaces of the outermost modules and the cathode mounts n=the module number.

The above description has not considered the possible effects of the harmonic frequencies above the fundamental of the vibration of the cathode. Typically, higher harmonic frequency effects on the beam current will not be sufficient to degrade the visual display and therefore no additional compensation ordinarily is required. Should such additional compensation be required, it will be recognized that the second harmonic frequency will be twice that of the fundamental. The nodes will appear at the supported ends and between modules n20 and n21. One of the antinodes will appear between modules n10 and n11 and the other antinode between modules n30 and n31.

SUMMARY OF THE INVENTION

Changes in electron beam current caused by vibration of a line cathode in a flat panel cathodoluminescent display device utilizing a plurality of electron guns are sensed. Compensation voltages which are related to the current changes are applied to the grids of the electron guns. Different compensating voltages are applied to the individual electron guns through an impedance network. The values utilized in the impedance network are defined by the mathematical definition of the displacement envelope of a vibrating wire.

BRIEF DESCRIPTION OF THE DRAWINGS

FIG. 4 is a block diagram schematic of a preferred embodiment of the invention.

DETAILED DESCRIPTION OF THE PREFERRED EMBODIMENT

As shown in FIG. 4 the output of the collector 25 is electrically coupled to one input of a comparator 26, the output of which is coupled to a counter 27. The output of the counter 27 is directed to a digital-to-analog converter (D/A), the output of which serves as the second input to the comparator 26.

Figure 3:
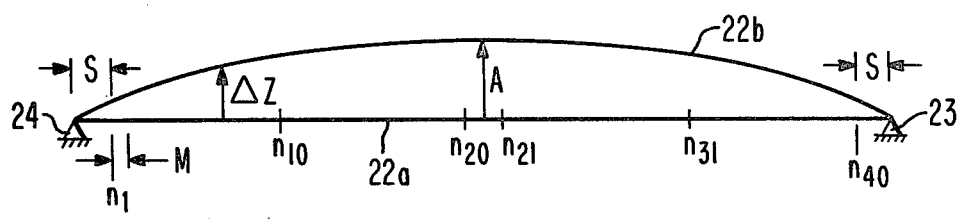
FIG. 3 is a schematic illustrating the envelope of vibration of a vibrating wire.

The output of comparator 26 also serves as an input to a cutoff logic circuit 29, the output of which controls the opened and closed states of two switches 31 and 32. The switches 31 and 32, respectively apply a positive and a negative voltage to a grid control line 33 through a multiplier 34. As is fully described hereinafter, these two voltages are the $\Delta z$ compensation voltages. The signal available on the control line 33 is used to control the voltages on the grids G1, G20 and G40 which are located at modules n1, n20 and n40. The signal on the line 33 also is applied to the grids associated with all of the channels 18, although the other grids are not shown in FIG. 4. The voltage applied to the grid G1 is applied through a resistor R1, the voltages applied to the grids G20 and G40 are applied through resistors R20 and R40 respectively. Accordingly, because the displacement of $\Delta z$ of cathode 22a, as shown in FIG. 3, varies at the center of each module in accordance with equation 6 the proper voltages for compensating for vibration in the Z direction are applied to each of the grids G1 through G40 by selecting the weighting impedances R1 through R40 in accordance with a weighting function which is related to the vibration envelope of the cathode 22. Typically the weighting impedances R1 through R40 are resistances, but if desired other impedances can be used.

The largest vibration compensation voltage is required at the module closest to the antinode. Therefore, the smallest impedance value is employed at that module. The values of the impedances used at the other modules, therefore, are related to the module nearest the antinode by the weighting function:

$$R_n = \frac{R_{N/2}}{\sin \pi \left[ \frac{(n - \frac{1}{2}) M + s}{2s + NM} \right]} \quad (7)$$

where:

$R_n$=impedance used at the nth module $R_{N/2}$=impedance used at the module nearest the antinode N=total number of modules (electron guns)

s=distance between outside boundary of outermost modules and the cathode mounts

M=the center to center spacing between adjacent modules n=the module number.

Also because the envelope of vibration is symmetrical about the antinode, the displacement $\Delta z$, and thus the impedances, also are symmetrical about the antinode. The impedance symmetry, therefore is defined by the relationship:

$$R_n = R_{(N-n+1)} \quad (8)$$

where:

Rn=the impedance at the nth module (electron gun)

$R_{(N-n+1)}$=impedance at the $(N-n+1)^{th}$ module n=the nth module

N=the total number of modules.

Figure 1:
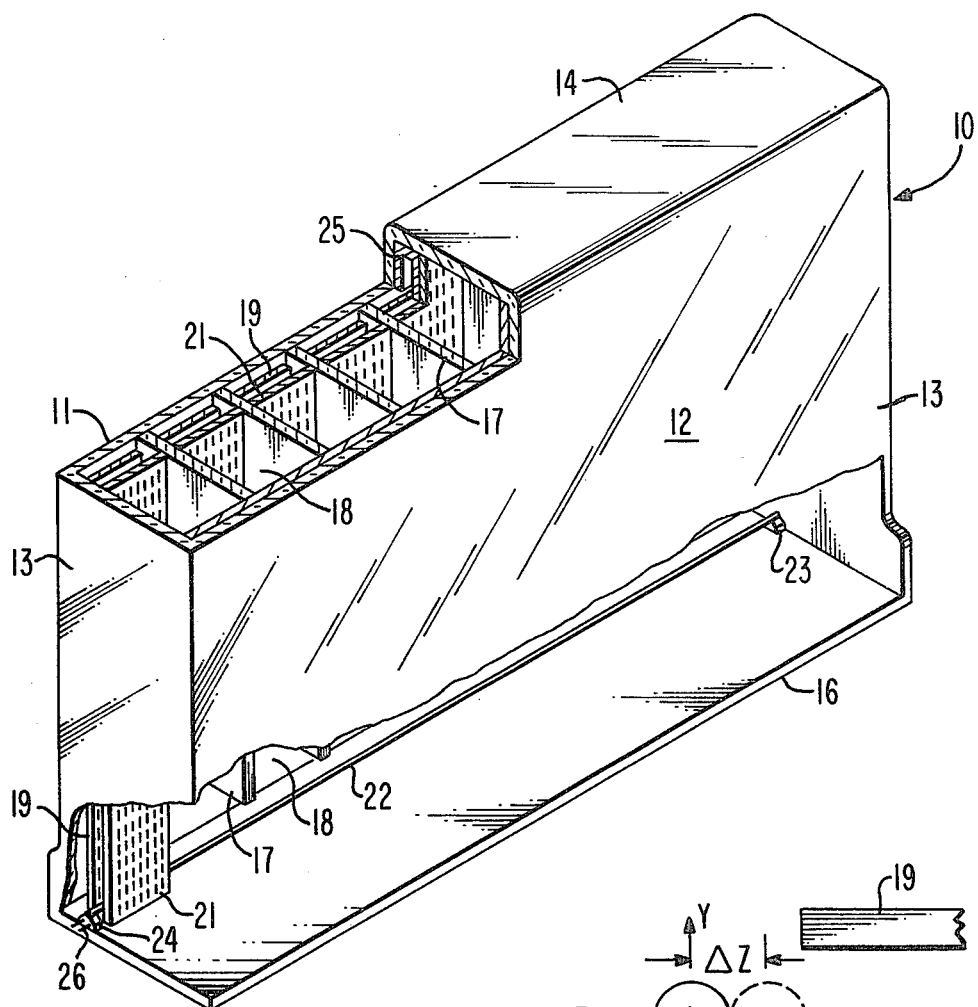
FIG. 1 is a perspective with parts broken away of a flat panel display device in which the instant invention can be used.
Figure 2:
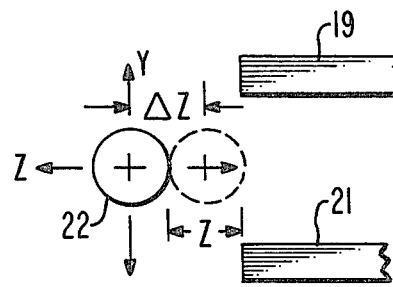
FIG. 2 is a section view of a portion of the device of FIG. 1 illustrating the planes of possible vibration of a line cathode.

Referring again to FIG. 4, each of the grids G1 through G40 is associated with an amplifier 36. The amplifiers 36 are actuated by digital-to-analog converters 37. The D/A converters 37 convert the digital outputs from random access memories (RAM) 38 to analog signals which are used to control the modulation voltages applied to the grids G1 through G40. Secondary shift registers 39 and primary shift registers 41 provide inputs to the RAM's 38. The shift registers 39 and 41 as well as the RAM's 38 and the D/A converters 37 are used to maintain a uniform brightness over the modules composing the viewing surface 21 of the envelope 10 of FIG. 1. The operation of these components is fully described in U.S. Pat. No. 4,126,814, issued to Frank J. Marlowe. The present invention utilizes the same collector 25 as the invention described in the Marlowe patent and the present invention cooperates with the invention therein described to maintain a uniform brightness across the video output of the envelope 10 while simultaneously compensating for vibration of the cathode 22.

A parallel connection of a capacitor 42 and a resistor 43 is coupled to the input of a multiplier 34. The capacitor 42 stores the vibration correction voltage and the resistor 43 discharges this voltage to zero with a time constant which is many times greater than the TV display line time. The capacitor 42 and the resistor 43 therefore cooperate to insure that the vibration correction voltage has an average value of zero. If the average value of the correction voltage were other than zero, the initial cutoff value stored in the RAM 38 associated with grid G20 when the power is turned on would cause spurious values of the quiescent correction voltage which would remain as constant DC components.

As mentioned above, the required level of the compensation voltage is determined during horizontal blanking of the display. For this reason the determination is made at a frequency in the order of 15 KHz. However, the cathode will have a resonant vibration frequency in the order of 20 Hz to 200 Hz. The compensation voltage therefore can be determined and applied as if the cathode were at rest in the displaced position.

In order to determine the required compensation voltage for the fundamental vibration frequency all guns except the one at module n20 are biased below cutoff by applying an inhibit signal to the amplifiers 36. It should be noted that because of the symmetry of $\Delta z$ about the antinode if desired the current from module n21 can be used. Alternatively, the currents from the modules n20 and n21 can be detected and the results averaged. The digital input to the D/A converter 37 situated at the module n20 is set at the cutoff voltage which would be required if the cathode were at rest. Because the cathode is vibrating the gun at module n20 may be either above or below cutoff. When the gun is above cutoff electrons impact collector 25 producing an input to comparator 26. The output of comparator 26 is applied to the cutoff logic circuit 29 and closes the switch 31 so that the cutoff voltage on the gun at n20 is changed and adjusted to the level required for electron flow to cease with the cathode in the displaced position. The compensation voltage determined in this manner is applied to the grids of all the electron guns G1 through G40 over the control line 33 and by means of the resistors R1 through R40. However, because the resistor valves are selected in accordance with equation (7), the voltages applied to the grids G1 through G40 are weighted in accordance with the envelope of the displaced cathode.

When the electron gun at module n20 is below cutoff, the operation is the same as described above except the switch 32 is closed to change the biasing voltage until electron flow first begins with the cathode in the displaced position. The compensation voltage adjustment made by closing the switches 31 and 32 therefore are related to the displacement $\Delta z$.

During the next horizontal blanking period, the displacement of the cathode has changed and the process is repeated.

In the event that significant second or higher harmonic effects are present, the above procedure is repeated but electron beam current changes are measured at the appropriate antinodes. Also, the voltages are applied through additional sets of resistors, the weighting functions of which are determined in accordance with equations similar to (7) above, but modified so as to describe the envelope(s) of the higher harmonics.

We claim:

1. In a multielectron gun cathodoluminescent display device having a grid for modulating the electron beams of said electron guns and a line cathode for providing electrons for said electron guns, a system for compensating for vibration of said line cathode comprising:
   means for sensing electron beam current at a selected one of said electron guns;
   means for setting the cutoff voltage of said selected electron gun;
   means for adjusting said cutoff voltage proportionally to said sensed electron beam current; and
   means for weighting said adjusted cutoff voltage in accordance with a weighting function which is related to the envelope of vibration of said cathode and for applying said weighted voltage to each of said grids so that the electron beam current of each electron gun is compensated relative to the actual cathode displacement occuring at each electron gun.

2. The system of claim 1 wherein said selected electron gun is located in the proximity of the antinode of said cathode.

3. The system of claim 2 wherein said means for adjusting includes a first switch associated with a positive compensating voltage for decreasing said cutoff voltage and a second switch associated with a negative compensating voltage for increasing said cutoff voltage.

4. The system of claim 3 further including means for averaging said compensating voltages to zero.

5. The system of claim 4 wherein said means for averaging is an R-C network.

6. The system of claim 1 wherein said weighting function is defined by:

$$R_n = \frac{R_{N/2}}{\sin \pi \left[ \frac{(n - \frac{1}{2})M + s}{2s + NM} \right]}$$

where:
$R_n$ = weighting impedance used at the nth electron gun
$R_{N/2}$ = weighting impedance used at the module nearest the antinode
N = total number of electron guns
s = distance between outside boundary of outermost modules and the cathode mounts
M = the center to center spacing between adjacent electron guns
n = the electron gun number.

7. The system of claim 6 wherein said selected electron gun is located in the proximity of the antinode of said cathode.

8. The system of claim 7 wherein said means for adjusting includes a first switch associated with a positive compensating voltage for decreasing said cutoff voltage and a second switch associated with a negative compensating voltage for increasing said cutoff voltage.

9. The system of claim 8 further including means for averaging said compensating voltages to zero.

10. The system of claim 9 wherein said means for averaging is an R-C network.

11. The system of claim 6 wherein said means for weighting includes individual impedances associated with said grids so that each grid receives a weighted compensating voltage.

12. The system of claim 11 wherein said impedances are resistances.

13. The system of claim 12 wherein said selected electron gun is located in the proximity of the antinode of said cathode.

14. The system of claim 13 wherein said means for adjusting includes a first switch associated with a positive compensating voltage for decreasing said cutoff voltage and a second switch associated with a negative compensating voltage for increasing said cutoff voltage.

15. The system of claim 14 wherein said means for averaging is an R-C network.

16. The system of claim 2 wherein said means for weighting includes individual impedances associated with said grids so that each grid receives a weighted compensating voltage.

17. The system of claim 16 wherein said impedances are resistances.

18. A method of compensating for electron beam current changes caused by vibration of a line cathode including the steps of:

applying a biasing voltage to the electron gun located in the proximity of the antinode of vibration and setting the biasing voltage equal to the cutoff voltage when the cathode is at rest;

sensing the electron beam current of said electron gun during vibration and developing a compensating voltage proportional to the sensed current;

adjusting said cutoff voltage with said compensating voltage so that said electron gun is biased to cutoff during vibration;

applying said compensating voltage to all of the electron guns along said cathode after weighting said compensating voltages so that each electron gun is compensated in accordance with the actual vibration displacement occuring at each of said electron guns.

19. The method of claim 18 wherein the step of weighting includes weighting said compensating voltage in accordance with the envelope of vibration of a vibrating wire.

20. The method of claim 18 wherein the step of weighting includes weighting said compensating voltage in accordance with the relationship:

$$R_n = \frac{RN/2}{\sin \pi \left[ \frac{(n - \frac{1}{2})M + s}{2s + NM} \right]}$$

where:
$R_n$ = the weighting impedance required at the $n^{th}$ electron gun
$RN/2$ = impedance used at the electron gun nearest the antinode
$n$ = electron gun
$M$ = spacing between adjacent electron guns
$N$ = total number of electron guns
$s$ = distance between cathode mounts and outermost electron guns.

21. The method of claim 20 further including the step of sensing said electron beam current at a frequency at least seventy-five times the line cathode vibration resonant frequency.

22. The method of claim 21 further including the step of discharging said compensating voltage to ground between said sensing steps.

* * * * *